United States Patent
Kim et al.

(10) Patent No.: US 11,938,895 B2
(45) Date of Patent: Mar. 26, 2024

(54) SENSOR INTEGRATION MODULE FOR DETECTING A VEHICLE INTERIOR AND AN OPERATION METHOD THEREOF

(71) Applicants: HYUNDAI MOTOR COMPANY, Seoul (KR); KIA CORPORATION, Seoul (KR)

(72) Inventors: Eung Hwan Kim, Seoul (KR); Gyun Ha Kim, Incheon (KR); Sang Kyung Seo, Seoul (KR); Dae Yun An, Anyang-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 157 days.

(21) Appl. No.: 17/410,816

(22) Filed: Aug. 24, 2021

(65) Prior Publication Data
US 2022/0134995 A1 May 5, 2022

(30) Foreign Application Priority Data
Nov. 3, 2020 (KR) .................. 10-2020-0145552

(51) Int. Cl.
 *B60R 22/48* (2006.01)
 *G06F 3/01* (2006.01)
(52) U.S. Cl.
 CPC ...... *B60R 22/48* (2013.01); *B60R 2022/4808* (2013.01); *B60R 2022/4866* (2013.01); *G06F 3/017* (2013.01)
(58) Field of Classification Search
 CPC ........... B60R 22/48; B60R 2022/4808; B60R 2022/4866; G06F 3/017

USPC ..................................... 340/457.1
See application file for complete search history.

(56) References Cited

U.S. PATENT DOCUMENTS

| 10,457,208 | B1 * | 10/2019 | Moffa | B60R 22/48 |
| 10,486,649 | B1 * | 11/2019 | Bennie | B60R 25/1004 |
| 2017/0232895 | A1 * | 8/2017 | Sines | G08B 25/016 348/148 |
| 2020/0406860 | A1 * | 12/2020 | Mai | B60R 25/31 |
| 2022/0111856 | A1 | 4/2022 | Kim et al. | |

FOREIGN PATENT DOCUMENTS

| CN | 109760628 A | * 5/2019 | ........... B60R 25/305 |
| KR | 20220047004 A | 4/2022 | |

* cited by examiner

*Primary Examiner* — Kam Wan Ma
(74) *Attorney, Agent, or Firm* — Lempia Summerfield Katz LLC

(57) ABSTRACT

A sensor integration module for detecting vehicle interior information and an operation method thereof are provided. The sensor integration module includes: a first sensor enabled based on first operation information and providing a sensing result as first sensing information; a second sensor enabled based on second operation information and providing a sensing result as second sensing information; a first communication device that transmits and receives information with electronic devices in a vehicle; and a controller that generates the first and second operation information for selectively enabling the first and second sensors based on information provided from the first communication device and provides the first communication device with the result determined based on the first and second sensing information.

19 Claims, 8 Drawing Sheets

| DRIVING SITUATION | ULTRASONIC WAVE | RADAR | ADDITIONAL RADAR | DETECTED AND DETERMINED RESULT | NOTIFICATION METHOD AFTER DETECTION |
|---|---|---|---|---|---|
| 1.DRIVER RIDING | X | O(GUIDANCE ON WEARING SEAT BELT) | O(GUIDANCE ON WEARING SEAT BELT) | START TO DRIVE | •DISPLAY (LAMP/SCREEN) INSIDE VEHICLE •BUZZER |
| 2.DRIVING | X | O(GESTURE RECOGNITION) | O(GESTURE RECOGNITION) | DRIVER COMMAND | •DISPLAY (LAMP/SCREEN) INSIDE VEHICLE •VOICE (BUZZER) GUIDANCE |
| 3.IMMEDIATELY AFTER ALIGHTING | O | O | O | PRESENCE OR ABSENCE OF REMAINING PASSENGER | •DISPLAY (LAMP/SCREEN) INSIDE AND OUTSIDE VEHICLE •SMS/APP NOTIFICATION/WIRELESS KEY NOTIFICATION/BUZZER |
| 4.PARKING | O(THEFT PREVENTION) | X | X | THEFT | •DISPLAY (LAMP/SCREEN) INSIDE AND OUTSIDE VEHICLE •BUZZER |
| 5.INTRUSION DETECTION | O | O(MOTION/LOCATION) | O(MOTION/LOCATION) | THEFT | •DISPLAY (LAMP/SCREEN) INSIDE AND OUTSIDE VEHICLE •SMS/APP NOTIFICATION/WIRELESS KEY NOTIFICATION/BUZZER |
| 6.TRAFFIC ACCIDENT (STOP) | O | O(MOTION/LOCATION) | O(MOTION/LOCATION) | RESCUE REQUEST | •DISPLAY (LAMP/SCREEN) INSIDE AND OUTSIDE VEHICLE •SMS/APP NOTIFICATION •CONNECT CALL CENTER •BUZZER |

| DRIVING SITUATION | ULTRASONIC WAVE | RADAR | ADDITIONAL RADAR | DETECTED AND DETERMINED RESULT | NOTIFICATION METHOD AFTER DETECTION |
|---|---|---|---|---|---|
| 1. DRIVER RIDING | X | O (GUIDANCE ON WEARING SEAT BELT) | O (GUIDANCE ON WEARING SEAT BELT) | START TO DRIVE | • DISPLAY (LAMP/SCREEN) INSIDE VEHICLE<br>• BUZZER |
| 2. DRIVING | X | O (GESTURE RECOGNITION) | O (GESTURE RECOGNITION) | DRIVER COMMAND | • DISPLAY (LAMP/SCREEN) INSIDE VEHICLE<br>• VOICE (BUZZER) GUIDANCE |
| 3. IMMEDIATELY AFTER ALIGHTING | O | O | O | PRESENCE OR ABSENCE OF REMAINING PASSENGER | • DISPLAY (LAMP/SCREEN) INSIDE AND OUTSIDE VEHICLE<br>• SMS/APP NOTIFICATION/WIRELESS KEY NOTIFICATION/BUZZER |
| 4. PARKING | O (THEFT PREVENTION) | X | X | THEFT | • DISPLAY (LAMP/SCREEN) INSIDE AND OUTSIDE VEHICLE<br>• BUZZER |
| 5. INTRUSION DETECTION | O | O (MOTION/LOCATION) | O (MOTION/LOCATION) | THEFT | • DISPLAY (LAMP/SCREEN) INSIDE AND OUTSIDE VEHICLE<br>• SMS/APP NOTIFICATION/WIRELESS KEY NOTIFICATION/BUZZER |
| 6. TRAFFIC ACCIDENT (STOP) | O | O (MOTION/LOCATION) | O (MOTION/LOCATION) | RESCUE REQUEST | • DISPLAY (LAMP/SCREEN) INSIDE AND OUTSIDE VEHICLE<br>• SMS/APP NOTIFICATION<br>• CONNECT CALL CENTER<br>• BUZZER |

FIG.3

SENSOR INTEGRATION MODULE FOR DETECTING A VEHICLE INTERIOR AND AN OPERATION METHOD THEREOF

CROSS-REFERENCE TO RELATED APPLICATION

This application claims the benefit of priority to Korean Patent Application No. 10-2020-0145552, filed in the Korean Intellectual Property Office on Nov. 3, 2020, the entire contents of which are incorporated herein by reference.

TECHNICAL FIELD

The present disclosure relates to a sensor integration module for detecting vehicle interior and an operation method thereof.

BACKGROUND

With the advancement of technology, for the convenience of users, various sensors, electronic devices, and the like have been provided in the vehicle. Particularly, research has been actively done for an advanced driver assistance system (ADAS) for the driving convenience of users. In addition, autonomous vehicles have been actively developed.

Furthermore, convenience devices associated with the safety of the users, the security of vehicles, the theft of the vehicles, and accidents of the vehicles have been actively developed other than the driving convenience of the users.

As a large amount of the above-mentioned convenience devices are loaded into the vehicle, power consumption of the vehicle causes problems.

SUMMARY

The present disclosure has been made to solve the above-mentioned problems occurring in the prior art while advantages achieved by the prior art are maintained intact.

An aspect of the present disclosure provides a sensing integration module for detecting vehicle interior information to maintain a convenience function for a user to use the vehicle, while reducing power consumption. Another aspect of the present disclosure provides an operation method therefor.

The technical problems to be solved by the present disclosure are not limited to the aforementioned problems. Any other technical problems not mentioned herein should be clearly understood from the following description by those having ordinary skill in the art to which the present disclosure pertains.

According to an aspect of the present disclosure, a sensor integration module for detecting vehicle interior information may include a first sensor that is determined to be enabled or disabled based on first operation information and provides a sensing result as first sensing information. The sensor integration module may also include a second sensor that is determined to be enabled or disabled based on second operation information and provides a sensing result as second sensing information. The sensor integration module may also include a first communication device that transmits and receives information with electronic devices in a vehicle. The sensor integration module may also include a controller that generates the first operation information and the second operation information for selectively enabling the first sensor and the second sensor based on information provided from the first communication device. The controller also provides the first communication device with the result determined based on the first sensing information and the second sensing information.

According to another aspect of the present disclosure, an operation method of a sensor integration module for detecting vehicle interior information may include identifying a driver riding situation, a driving situation, an alighting situation, a parking situation, an intrusion detection situation, and a vehicle accident situation. The operation method may also include selectively enabling a first sensor and a second sensor depending on the identified result and receiving sensing information provided from the first sensor and the second sensor being selectively enabled. The operation method may also include: notifying a passenger that he or she does not wear his or her seat belt; performing a command corresponding to a gesture of the passenger; determining whether there is a remaining passenger; determining whether there is intrusion; determining whether there is an intruder; determining a location and motion of the intruder; determining whether there is a passenger; and/or determining a location and motion of the passenger based on the provided sensing information.

BRIEF DESCRIPTION OF THE DRAWINGS

The above and other objects, features, and advantages of the present disclosure should be more apparent from the following detailed description taken in conjunction with the accompanying drawings:

FIG. 3 is a table illustrating a function of a sensor integration module for detecting vehicle interior information according to an embodiment of the present disclosure.

DETAILED DESCRIPTION

Figure 1:
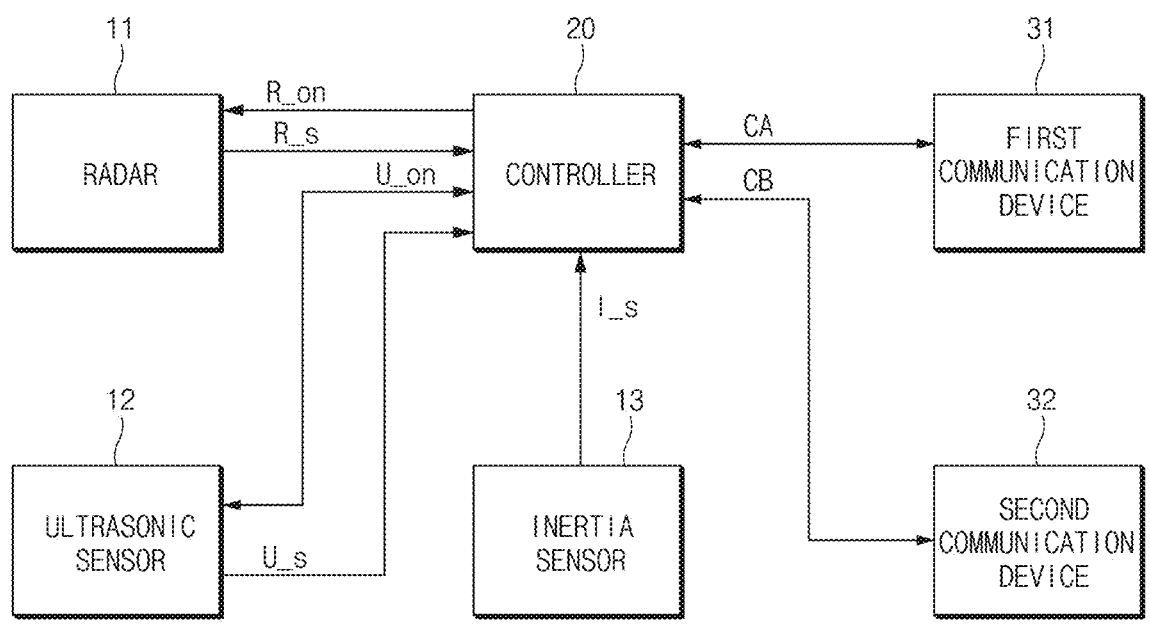
FIG. 1 is a block diagram illustrating a configuration of a sensor integration module for detecting vehicle interior information according to an embodiment of the present disclosure.

Hereinafter, some embodiments of the present disclosure are described in detail with reference to the drawings. In adding the reference numerals to the components of each drawing, it should be noted that the identical or equivalent components are designated by the identical numerals even when they are displayed on other drawings. Further, in describing the embodiments of the present disclosure, a detailed description of well-known features or functions has been omitted in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component. These terms do not limit the nature, sequence, or order of the constituent components. Unless otherwise defined, all terms used herein, including technical or scientific terms, have the same meanings as those generally understood by those having ordinary skill in the art to which the present disclosure pertains. Such terms as those defined in a generally used dictionary should be interpreted as having meanings consistent with the contextual meanings in the relevant field of art. Such terms should not be interpreted as having ideal or excessively formal meanings unless clearly defined as having such in the present application. When a component, device, element, or the like of the present disclosure is described as having a purpose or performing an operation, function, or the like, the component, device, or element should be considered herein as being "configured to" meet that purpose or to perform that operation or function.

Hereinafter, embodiments of the present disclosure are described in detail with reference to FIGS. 1-8.

FIG. 1 is a block diagram illustrating a configuration of a sensor integration module for detecting vehicle interior information according to an embodiment of the present disclosure.

Referring to FIG. 1, a sensor integration module 100 for detecting vehicle interior information according to an embodiment of the present disclosure may be implemented in a vehicle. In this case, the sensor integration module 100 for detecting the vehicle interior, i.e., detecting information regarding the vehicle interior, may be integrally configured with control units in the vehicle or may be implemented as a separate device to be connected with the control units of the vehicle by a separate connection means.

Referring to FIG. 1, the sensor integration module 100 for detecting the vehicle interior according to an embodiment of the present disclosure may include a first sensor 11, a second sensor 12, a third sensor 13, a controller 20, a first communication device 31, and a second communication device 32.

Each of the first sensor 11 and the second sensor 12 may include a sensor capable of sensing at least one of whether there is a passenger in the vehicle, a location of the passenger, or a motion of the passenger.

For example, the first sensor 11 may include a radar.

The radar may emit an electromagnetic wave and may receive the electromagnetic wave reflected from an object to generate sensing information such as whether there is the object, a location of the object, and a distance from the object.

The first sensor 11 including the radar may be enabled or disabled based on first operation information R_on. The enabled first sensor 11 may emit an electromagnetic wave to a detection area and may generate first sensing information R_s based on the reflected electromagnetic wave.

The second sensor 12 may include an ultrasonic sensor.

The ultrasonic sensor may emit an ultrasonic wave and may receive the ultrasonic wave reflected from an object to generate sensing information such as whether there is the object, a location of the object, and a distance from the object.

The second sensor 12 including the ultrasonic sensor may be enabled or disabled based on second operation information U_on. The enabled second sensor 12 may emit an ultrasonic wave to a detection area and may generate second sensing information U_s based on the reflected ultrasonic wave.

The radar may have higher power consumption than the ultrasonic sensor but may have higher sensing resolution for the detection area that the ultrasonic sensor. On the other hands, the ultrasonic sensor may have lower sensing resolution for the detection area than the radar but may have lower power consumption than the radar.

Therefore, the sensor integration module 100 for detecting the vehicle interior according to an embodiment of the present disclosure may include a technology which uses the ultrasonic sensor when continuing detecting the detection area, i.e., the vehicle interior. In another embodiment, the sensor integration module 100 may include a technology which uses the ultrasonic sensor and the radar at the same time or uses only the radar, when a specific event occurs or when there is no concern for power supply to the vehicle interior.

Hereinafter, the first sensor 11 is described as the radar and the second sensor 12 is described as the ultrasonic sensor, but not limited thereto.

The third sensor 13 may include an inertial sensor capable of sensing a state such as a slope, shaking, or impact of the vehicle.

For example, the third sensor 13 including the inertial sensor may sense a slope, shaking, impact, and the like of the vehicle to generate third sensing information I_s.

Hereinafter, the third sensor 13 is described as the inertial sensor, but not limited thereto.

The controller 20 may provide the radar 11 and the ultrasonic sensor 12 with the first operation information R_on and the second operation information U_on determining whether to enable the radar 11 and the ultrasonic sensor 12. The controller 20 may receive the first sensing information R_s and the second sensing information U_s from the radar 11 and the ultrasonic sensor 12.

The controller 20 may receive the third sensing information I_s from the inertial sensor 13.

The controller 20 may transmit and receive first communication information CA with the first communication device 31.

The controller 20 may transmit and receive second communication information CB with the second communication device 32.

For example, the controller 20 may detect opening of the vehicle door and starting of the vehicle based on the first communication information CA provided from the first communication device 31 and may generate the first operation information R_on to enable the radar 11, when the vehicle is traveling.

The controller 20 may determine whether there is a passenger, a location of the passenger, and a motion of the passenger based on the first sensing information R_s provided from the radar 11, while the radar 11 is enabled. The controller 20 may provide the first communication device 31 with the determined result as the first communication information CA.

When detecting that the vehicle is turned off based on the first communication information CA provided from the first communication device 31, the controller 20 may generate both the first operation information R_on and the second operation information U_on during a predetermined time to enable the radar 11 and the ultrasonic sensor 12 at the same time.

The controller 20 may determine whether there is a passenger in the vehicle based on the first sensing information R_s and the second sensing information U_s respectively provided from the radar 11 and the ultrasonic sensor 12, which are enabled during a predetermined time after the vehicle is turned off. The controller 20 may provide the first communication device 31 with the determined result as the first communication information CA.

When it is determined that a parking event occurs (that impact or vibration is applied to the vehicle) based on the inertial sensor 13 after the vehicle is turned off and the predetermined time elapses, the controller 20 may provide the ultrasonic sensor 12 with the second operation information U_on disabling the radar 11 and enabling only the ultrasonic sensor 12 between the radar 11 and the ultrasonic sensor 12.

After the vehicle is turned off and the predetermined time elapses, i.e., when a parking event occurs after the parking of the vehicle is completed, the controller 20 may determine an attempt to intrude into the vehicle based on the second sensing information U_s provided from the ultrasonic sensor 12. The controller 20 also may provide the first communication device 31 with the determined result as the first communication information CA.

Furthermore, when vehicle intrusion is detected from abnormal opening of the vehicle door or the sensing result of the ultrasonic sensor 12, the controller 20 may provide the radar 11 and the ultrasonic sensor 12 with the first operation information R_on and the second operation information U_on respectively enabling the radar 11 and the ultrasonic sensor 12.

In addition, when the vehicle intrusion is detected, the controller 20 may determine a motion and a location of an intruder based on the first sensing information R_s and the second sensing information U_s respectively provided from the enabled radar 11 and the enabled ultrasonic sensor 12. The controller 20 also may provide the first communication device 31 with the determined result as the first communication information CA.

The controller 20 may detect a vehicle accident based on the first communication information CA provided from the first communication device 31 and the third sensing information I_s provided from the inertial sensor 13.

When the vehicle accident is detected, the controller 20 may provide the radar 11 and the ultrasonic sensor 12 with the first operation information R_on and the second operation information U_on respectively enabling the radar 11 and the ultrasonic sensor 12.

Upon the vehicle accident, the controller 20 may determine a motion and a location of a passenger based on the first sensing information R_s and the second sensing information U_s respectively provided from the enabled radar 11 and the enabled ultrasonic sensor 12 and may provide the first communication device 31 with the determined result as the first communication information CA.

The first communication device 31 may facilitate communication between the controller 20 and electronic devices in the vehicle.

In this case, the electronic devices in the vehicle, which communicates with the first communication device 31, may include a display device, an alarm device, a safety device, a vehicle door detection device, a start detection device, a telematics multimedia system (TMS), and the like.

The display device may include an electronic device for providing a passenger with visual information. The alarm device may include an electronic device for providing a passenger or the outside of the vehicle with audible information.

The safety device may include an electronic device for determining whether the passenger wears his or her seat belt or an electronic device for determining closing or opening of the vehicle door. Furthermore, the safety device may include an electronic device capable of detecting whether the airbag is deployed.

The vehicle door detection device may include an electronic device for detecting an open state, a closed state, and a lock state of the vehicle door.

The start detection device may include an electronic device for detecting whether the vehicle is turned on. The TMS may include an electronic device capable of transmitting a notification, such as text, to an electronic device outside the vehicle.

The second communication device 32 may perform communication between sensor integration modules 100 for detecting vehicle interior according to an embodiment of the present disclosure.

The second communication device 32 may communicate with another sensor integration module for detecting vehicle interior to enable or disable at least one of a radar or an ultrasonic sensor included in the other sensor integration module for detecting the vehicle interior. The second communication device 32 may receive first sensing information R_s and second sensing information U_s sensed from the at least enabled one of the radar and the ultrasonic sensor.

Figure 2:
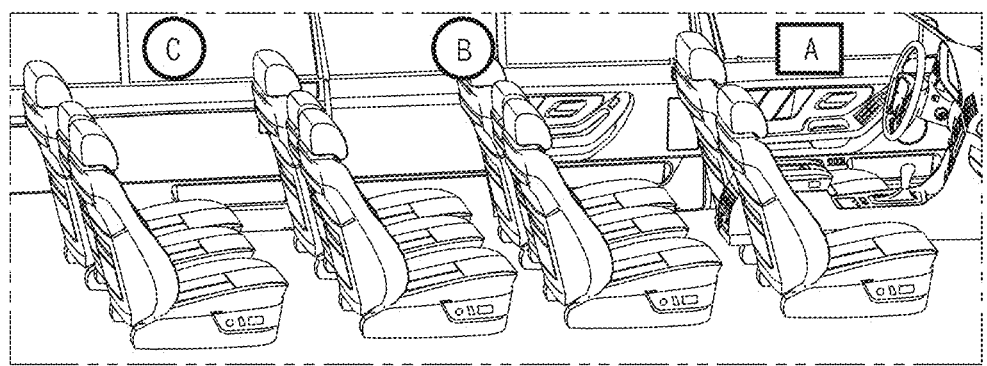
FIG. 2 is a drawing illustrating arrangement of sensor integration modules for detecting vehicle interior information according to an embodiment of the present disclosure.

FIG. 2 is a drawing illustrating arrangement of sensor integration modules for detecting vehicle interior according to an embodiment of the present disclosure.

FIG. 2 illustrates arrangement of sensor integration modules for detecting vehicle interior according to an embodiment of the present disclosure in the vehicle. The sensor integration modules for detecting the vehicle interior according to an embodiment of the present disclosure may be arranged on at least one of A, B, or C.

In this case, locations of the sensor integration modules 100 for detecting the vehicle interior according to an embodiment of the present disclosure, shown in FIG. 2, i.e., A, B, and C are illustrative, but not limited thereto.

For example, when the sensor integration module 100 for detecting the vehicle interior according to an embodiment of the present disclosure is disposed one of A, B, or C, a second communication device 32 shown in FIG. 1 may be disabled.

Furthermore, the sensor integration module 100 for detecting the vehicle interior according to an embodiment of the present disclosure may enable all components except for the second communication device 32, i.e., a radar 11, an ultrasonic sensor 12, an inertial sensor 13, a controller 20, and a first communication device 31, and may perform each operation thereof.

Meanwhile, the sensor integration modules 100 for detecting the vehicle interior according to an embodiment of the present disclosure are installed in at least two of A, B, or C of FIG. 2. All the components included in the sensor integration module 100 for detecting the vehicle interior shown in FIG. 1, i.e., the radar 11, the ultrasonic sensor 12, the inertial sensor 13, the controller 20, the first communication device 31, and the second communication device 32 may be enabled to perform each operation thereof.

In this case, one of the at least two sensor integration modules 100 for detecting the vehicle interior, which are arranged in the vehicle, may be a main sensor integration module for detecting vehicle interior. The first communication device 31 of the main sensor integration module for detecting the vehicle interior may communicate with electronic devices in the vehicle. For example, the electronic devices may include a display device, an alarm device, a safety device, a vehicle door detection device, a start detection device, a telematics multimedia system (TMS), and the like. The other sensor integration module 100 for detecting the vehicle interior, except for the main sensor integration module, may be a sub-sensor integration module for detecting vehicle interior information. A first communication device of the sub-sensor integration module for detecting the vehicle interior may be disabled.

In addition, a radar and an ultrasonic sensor included in the sub-sensor integration module 100 for detecting the vehicle interior may be determined to be enabled or disabled according to communication information received from the main sensor integration module 100 for detecting the vehicle interior.

For example, the sub-sensor integration module 100 for detecting the vehicle interior may transmit sensing information of the radar and the ultrasonic sensor to the main sensor integration module 100 for detecting the vehicle interior.

FIG. 3 is a table illustrating a function of a sensor integration module for detecting vehicle interior according to an embodiment of the present disclosure.

FIG. 3 illustrates a sensor integration module 100 for detecting vehicle interior information according to an embodiment of the present disclosure. The sensor integration module 100 selectively enables an ultrasonic sensor and a radar in each situation such as a driver riding situation, a driving situation, an alighting situation, a parking situation, an intrusion detection situation, or a vehicle accident situation, but not limited to only the situations shown in FIG. 3.

Referring to FIG. 3, the sensor integration module 100 for detecting the vehicle interior according to an embodiment of the present disclosure may enable only a radar 11 between the radar 11 and an ultrasonic sensor 12 in the driver riding situation. When the sensor integration module 100 for detecting the vehicle interior according to an embodiment of the present disclosure is additionally disposed in the vehicle, a radar of the added sensor integration module 100 for detecting the vehicle interior may be enabled.

The sensor integration module 100 for detecting the vehicle interior according to an embodiment of the present disclosure may enable only the radar 11 between the radar 11 and the ultrasonic sensor 12 in the driving situation. When the sensor integration module 100 for detecting the vehicle interior according to an embodiment of the present disclosure is additionally disposed in the vehicle, the radar of the added sensor integration module 100 for detecting the vehicle interior may be enabled.

The sensor integration module 100 for detecting the vehicle interior according to an embodiment of the present disclosure may enable all the radar 11 and the ultrasonic sensor 12 in the alighting situation. When the sensor integration module 100 for detecting the vehicle interior according to an embodiment of the present disclosure is additionally disposed in the vehicle, the radar of the added sensor integration module 100 for detecting the vehicle interior may be enabled.

The sensor integration module 100 for detecting the vehicle interior according to an embodiment of the present disclosure may enable only the ultrasonic sensor 12 between the radar 11 and the ultrasonic sensor 12 in the parking situation. When the sensor integration module 100 for detecting the vehicle interior according to an embodiment of the present disclosure is additionally disposed in the vehicle, both the radar and an ultrasonic sensor of the added sensor integration module 100 for detecting the vehicle interior may be disabled.

The sensor integration module 100 for detecting the vehicle interior according to an embodiment of the present disclosure may enable both the radar 11 and the ultrasonic sensor 12 in the intrusion detection situation. When the sensor integration module 100 for detecting the vehicle interior according to an embodiment of the present disclosure is additionally disposed in the vehicle, the radar of the added sensor integration module 100 for detecting the vehicle interior may be enabled.

The sensor integration module 100 for detecting the vehicle interior according to an embodiment of the present disclosure may enable both the radar 11 and the ultrasonic sensor 12 in the vehicle accident situation. When the sensor integration module 100 for detecting the vehicle interior according to an embodiment of the present disclosure is additionally disposed in the vehicle, the radar of the added sensor integration module 100 for detecting the vehicle interior may be enabled.

A description is given below to explain a function of the sensor integration module for detecting the vehicle interior according to an embodiment of the present disclosure, operations of respective components, and purposes of the respective components with reference to FIGS. 1 and 3.

First, in the driver riding situation, the sensor integration module 100 for detecting the vehicle interior according to an embodiment of the present disclosure may enable the radar 11 from among the radar 11 and the ultrasonic sensor 12 to detect a riding position of a passenger and guide the passenger to wear his or her seat belt by means of a display (a display device) or an alarm device in the vehicle.

In this case, a description is given below to explain the operations of the respective components of the sensor integration module 100 for detecting the vehicle interior in the driving riding situation.

The first communication device 31 may receive information indicating that the door of the vehicle changes from a closed state to an open state from a vehicle door detection device and may provide the controller 20 with the received information as the first communication information CA.

As the locked state of the door is normally released, when the open state is detected from the first communication information CA, the controller 20 may determine the current situation as the driver riding situation where the driver rides in the vehicle and may provide the radar 11 with the first operation information R_on, thus enabling the radar 11.

When there is a sensor integration module for detecting vehicle interior information additionally disposed in the vehicle, the controller 20 may transmit information for enabling a radar of the added sensor integration module for detecting the vehicle interior via the second communication device 32. The radar of the added sensor integration module for detecting the vehicle interior may be enabled. Sensing information sensed from the radar of the added sensor integration module for detecting the vehicle interior may be received via the second communication device 32.

Furthermore, the first communication device 31 may receive information indicating whether the passenger wears his or her seat belt from a safety device and may provide the controller 20 with the received information.

The controller 20 may detect a passenger who does not wear his or her seat belt from among passengers who ride in the vehicle, based on the first sensing information R_s sensing a location of the passenger, which is provided from the enabled radar 11. The controller 20 may also detect whether the passenger wears his or her seat belt, which is provided via the first communication device 31 from the safety device. The controller 20 may provide the detected result as guidance on wearing a seat belt and a warning sound by means of at least one of the display device (e.g., the display) and the alarm device (e.g., a buzzer or a speaker) via the first communication device 31.

Secondly, in the driving situation, the sensor integration module 100 for detecting the vehicle interior according to an embodiment of the present disclosure may enable the radar 11 from among the radar 11 and the ultrasonic sensor 12 to detect a motion of a passenger and perform a command of the passenger by means of the display (the display device) or the alarm device in the vehicle.

In this case, a description is given below to explain the operations of the respective components of the sensor integration module 100 for detecting the vehicle interior in the driving situation.

The first communication device 31 may receive information indicating that the vehicle is turned on from a start detection device and may provide the controller 20 with the received information as the first communication information CA.

When receiving the information indicating that the vehicle is turned on as the first communication information CA, the controller 20 may determine the current situation as the driving situation. The controller 20 may continue providing the radar 11 with the first operation information R_on, thus keeping the radar 11 enabled in the driving riding situation enabled.

The controller 20 may detect a motion (or recognize a gesture) of the passenger, which is provided from the enabled radar 11 and may provide the first communication device 31 with a command corresponding to the motion of the passenger as the first communication information CA.

The first communication device 31 may transmit the command corresponding to the motion of the passenger to electronic devices (e.g., the display device and the alarm device) installed in the vehicle, such that the electronic devices perform the command corresponding to the motion of the passenger.

Thirdly, in the alighting situation, the sensor integration module 100 for detecting the vehicle interior according to an embodiment of the present disclosure may enable both the radar 11 and the ultrasonic sensor 12 to detect whether there is a passenger who remains in the vehicle and may provide at least one of the display device, the alarm device, or the TMS with the detected result.

In this case, a description is given below to explain the operations of the respective components of the sensor integration module 100 for detecting the vehicle interior in the alighting situation.

The first communication device 31 may receive information indicating that the vehicle is turned off from the start detection device, may receive information indicating that the vehicle door is locked from the vehicle door detection device, and may provide the controller 20 with the received information as the first communication information CA.

The controller 20 may determine that the current situation is the alighting situation from the information indicating that the vehicle is turned off and the information indicating that the vehicle door is locked, as the first communication information CA. The controller 20 may provide the radar 11 and the ultrasonic sensor 12 with the first operation information R_on and the second operation information U_on during a predetermined time. Thus, both the radar 11 and the ultrasonic sensor 12 may be enabled during the predetermined time after detecting the alighting situation.

The controller 20 may determine whether there is a remaining passenger from the first sensing information R_s and the second sensing information U_s respectively provided from the radar 11 and the ultrasonic sensor 12, which are enabled in the alighting situation. The controller 20 may provide at least one of the display device, the alarm device, or the TMS with the determined result.

For example, the controller 20 may determine whether there is a remaining passenger based on the first sensing information R_s and the second sensing information U_s in the alighting situation. When the passenger remains in the vehicle, the controller 20 may notify the driver or the passenger that the passenger remains in the vehicle by means of at least one of the display device, the alarm device, or the TMS.

Fourthly, in the parking situation, when a parking event occurs (when impact or vibration is applied to the vehicle), the sensor integration module 100 for detecting the vehicle interior according to an embodiment of the present disclosure may enable the ultrasonic sensor 12 and may determine whether the occurrence of the parking event is a slight risk based on the second sensing information U_s provided from the enabled ultrasonic sensor 12.

For example, in the parking situation, when it is determined that the parking event where impact is applied to the vehicle or where vibration is detected in the vehicle occurs based on the sensing result of the inertial sensor 13, the sensor integration module 100 for detecting the vehicle interior according to an embodiment of the present disclosure may enable the ultrasonic sensor 12 and may determine whether the current situation is a slight risk situation, such as impact or vibration caused by wind or light contact, or is a high risk situation, such as impact or vibration caused by an intrusion.

In this case, in the parking situation, when determining the parking event is the slight risk situation, the sensor integration module 100 for detecting the vehicle interior according to an embodiment of the present disclosure may enable the ultrasonic sensor 12 during a predetermined time.

Meanwhile, in the parking situation, when determining that the parking event is the high risk situation such as intrusion rather than the slight risk (the amount of change in the wind or light contact), the sensor integration module 100 for detecting the vehicle interior according to an embodiment of the present disclosure may enable the radar 11 as well as the ultrasonic sensor 12.

A description is given below to explain the operations of the respective components of the sensor integration module 100 for detecting the vehicle interior in the parking situation.

The first communication device 31 may receive information indicating that the vehicle is turned off from the start detection device, may receive information indicating that locking of the door is detected from the vehicle door detection device, and may provide the controller 20 with the received information as the first communication information CA.

When a predetermined time elapses after receiving the first communication information CA from the first communication device 31, the controller 20 may determine that the current situation is the parking situation.

The controller 20 may receive information indicating that impact or vibration applied to the vehicle is detected from the inertial sensor 13 in the parking situation and may determine that the parking event occurs.

When determining that the parking event occurs, the controller 20 may provide the ultrasonic sensor 12 with the second operation information U_on enabling the ultrasonic sensor 12.

The controller 20 may determine whether the parking event occurring is a situation (a slight risk situation) caused by wind or light contact or is a high risk situation such as an intrusion, based on the second sensing information U_s provided from the enabled ultrasonic sensor 12.

When determining that the parking event is the situation caused by wind or light contact, the controller 20 may enable the ultrasonic sensor 12 during a predetermined time.

In this case, the controller 20 may provide the first communication device 31 with information indicating that the parking event occurring is the situation by the wind or the light contact as the first communication information CA. The first communication device 31 may provide the driver with the information indicating that the parking event is the slight risk by means of the alarm device and the TMS.

Meanwhile, when determining that the parking event is the high risk situation (the intrusion detection situation), the controller 20 may provide the radar 11 and the ultrasonic sensor 12 with the first operation information R_on and the second operation information U_on respectively enabling the radar 11 and the ultrasonic sensor 12.

Fifthly, in the intrusion detection situation, the sensor integration module 100 for detecting the vehicle interior according to an embodiment of the present disclosure may enable both the radar 11 and the ultrasonic sensor 12 to detect a motion and a location of an intruder and may provide at least one of the display device, the alarm device, or the TMS with the detected result.

In this case, a description is given below to explain the operations of the respective components of the sensor integration module 100 for detecting the vehicle interior in the intrusion detection situation.

When the first communication device 31 receives information indicating that the door is abnormally opened from the vehicle door detection device and provides the controller with the received information, the controller 20 may determine the current situation as the intrusion detection situation.

Furthermore, the controller 20 may determine the current situation as the intrusion detection situation based on the sensing result by the ultrasonic sensor 12 in the parking situation.

When determining that the current situation is the intrusion detection situation, the controller 20 may provide the radar 11 and the ultrasonic sensor 12 with the first operation information R_on and the second operation information U_on respectively enabling the radar 11 and the ultrasonic sensor 12.

The controller 20 may determine a motion and a location of an intruder based on the first sensing information R_s and the second sensing information U_s respectively sensed by the enabled radar 11 and the enabled ultrasonic sensor 12. The controller 20 may provide the first communication device 31 with the determined result as the first communication information CA.

The first communication device 31 may provide at least one of the display device, the alarm device, or the TMS with the result of determining the motion and the location of the intruder.

As a result, in the intrusion detection situation, the sensor integration module 100 for detecting the vehicle interior according to an embodiment of the present disclosure may be configured to recognize that the driver, the passenger, or persons around the vehicle intrude into the vehicle and may recognize the motion and the location of the intruder.

Sixthly, in the vehicle accident situation, the sensor integration module 100 for detecting the vehicle interior according to an embodiment of the present disclosure may enable both the radar 11 and the ultrasonic sensor 12 to detect motions and locations of passengers including a driver in the vehicle and may provide at least one of the display device, the alarm device, or the TMS with the detected result.

In this case, a description is given below to explain the operations of the respective components of the sensor integration module 100 for detecting the vehicle interior in the vehicle accident situation.

The first communication device 31 may receive information indicating that the airbag is deployed from the safety device or may receive information indicating that an impact larger than a predetermined amount of impact is detected from the inertial sensor 13 and may provide the controller 20 with the received information.

When determining that the airbag is deployed or when an impact is detected that is larger than the predetermined amount of impact, the controller 20 may determine the current situation as the vehicle accident situation.

When determining that the current situation is the vehicle accident situation, the controller 20 may generate the first operation information R_on and the second operation information U_on respectively enabling the radar 11 and the ultrasonic sensor 12. The controller 20 may provide the radar 11 and the ultrasonic sensor 12 with the generated first operation information R_on and the generated second operation information U_on.

The controller 20 may determine information about locations and motions of passengers including the driver based on the first sensing information R_s and the second sensing information U_s respectively sensed from the enabled radar 11 and the enabled ultrasonic sensor 12. The controller 20 may provide at least one of the display device, the alarm device, or the TMS with the determined result via the first communication device 31.

Thus, the sensor integration module 100 for detecting the vehicle interior according to an embodiment of the present disclosure may notify persons around the vehicle and a call center of the accident situation and the location and motion of the passenger in the vehicle in the vehicle accident situation.

FIGS. 4-8 are flowcharts illustrating operations of a sensor integration module for detecting vehicle interior information according to an embodiment of the present disclosure.

Figure 4:
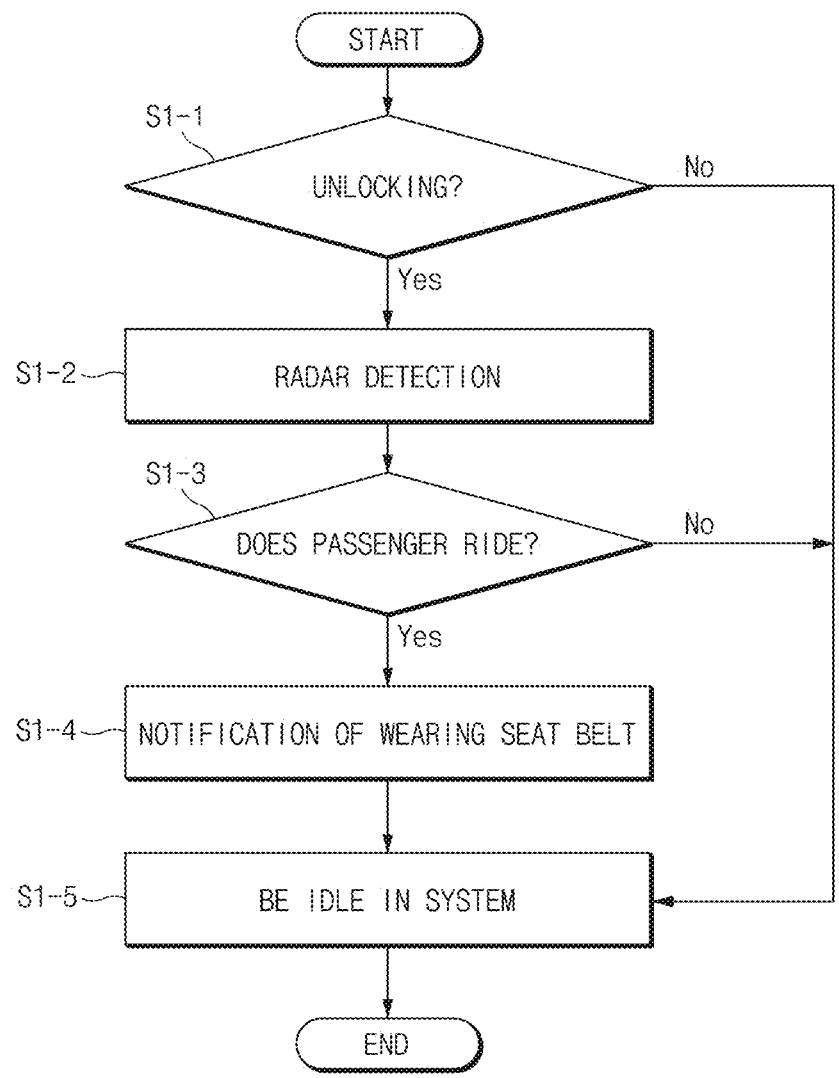
FIGS. 4, 5, 6, 7, and 8 are flowcharts illustrating operations of a sensor integration module for detecting vehicle interior information according to an embodiment of the present disclosure.

FIG. 4 is a flowchart illustrating an operation of a sensor integration module for detecting vehicle interior information in a driver riding situation according to an embodiment of the present disclosure.

An operation method of the sensor integration module for detecting the vehicle interior according to an embodiment of the present disclosure may include unlocking (S1-1), radar detection (S1-2), determining (S1-3) whether a passenger rides, providing (S1-4) a notification of wearing the seat belt, and being idle (S1-5) in the system.

S1-1 may include detecting whether the vehicle door is normally opened.

For example, S1-1 may include receiving, by a first communication device 31 of FIG. 1, information indicating that the normal opening of the door is detected (Yes) from a vehicle door detection device. S1-1 may also include delivering, by the first communication device 31, the received information to a controller 20 of FIG. 1. S1-1 may also include determining, by the controller 20, that the current situation is a driving riding situation based on the information transmitted from the first communication device 31.

When the normal opening of the vehicle door is not detected (No), S1-1 may proceed to S1-5.

When the normal opening of the door is detected in S1-1, S1-2 may include enabling a radar 11 of FIG. 1 and delivering information detected from the enabled radar 11 to the controller 20.

For example, when it is determined that the current situation is the driver riding situation in S1-1, S1-2 may include providing, by the controller 20, the radar 11 with first operation information R_on enabling the radar 11 and providing, by the radar 11 enabled by receiving the first operation information R_on, the controller 20 with the detected first sensing information R_s.

S1-3 may include determining whether the passengers including a driver ride in the vehicle.

For example, S1-3 may include determining whether the passenger rides in the vehicle based on the first sensing information R_s provided from the enabled radar 11.

In detail, S1-3 may include determining that the passenger rides in the vehicle, when a motion of the passenger is detected in the vehicle based on the first sensing information R_s provided from the enabled radar 11. S1-3 may also include determining that the passenger does not ride in the vehicle, when the motion of the passenger is not detected in the vehicle.

When the riding of the passenger is detected in S1-3 (Yes), S1-4 may be performed.

When the riding of the passenger is not detected in S1-3 (No), S1-5 may be performed.

When the passenger who rides in the vehicle does not wear his or her seat belt, S1-4 may include providing the passenger, who does not wear his or her seat belt, with a notification of wearing the seat belt by means of a display device and/or an alarm device.

For example, S1-4 may include detecting a location of the passenger in the vehicle from the enabled radar 11 and a safety device, which detects whether the passenger wears his or her seat belt and may deliver information about the passenger of the location, who does not wear his or her seat belt, to the display device and the alarm device based on information about whether the passenger wears his or her seat belt provided from the detected location of the passenger. Thus, the passenger who does not wear his or her seat belt may be provided with the notification of wearing the seat belt.

S1-5 may include switching to an idle state, when the opening of the vehicle door is not detected in S1-1, when the riding of the passenger is not detected in S1-3, or after the notification of wearing the seat belt is provided in S1-4.

For example, S1-5 may include switching to the idle state in the sensor integration module 100 for detecting the vehicle interior according to an embodiment of the present disclosure, when the opening of the vehicle door is not detected in S1-1, when the riding of the passenger is not detected in S1-3, or after the notification of wearing the seat belt is provided in S1-4.

In this case, detecting the location of the passenger using the radar 11 rather than the ultrasonic sensor 12 in the driving riding situation may be because the radar 11 is able to detect the location of the passenger within a shorter time because of having higher detection resolution than the ultrasonic sensor 12.

Thus, the sensor integration module 100 for detecting the vehicle interior according to an embodiment of the present disclosure may determine whether the passenger wears his or her seat belt for each seat within a short time.

Figure 5:
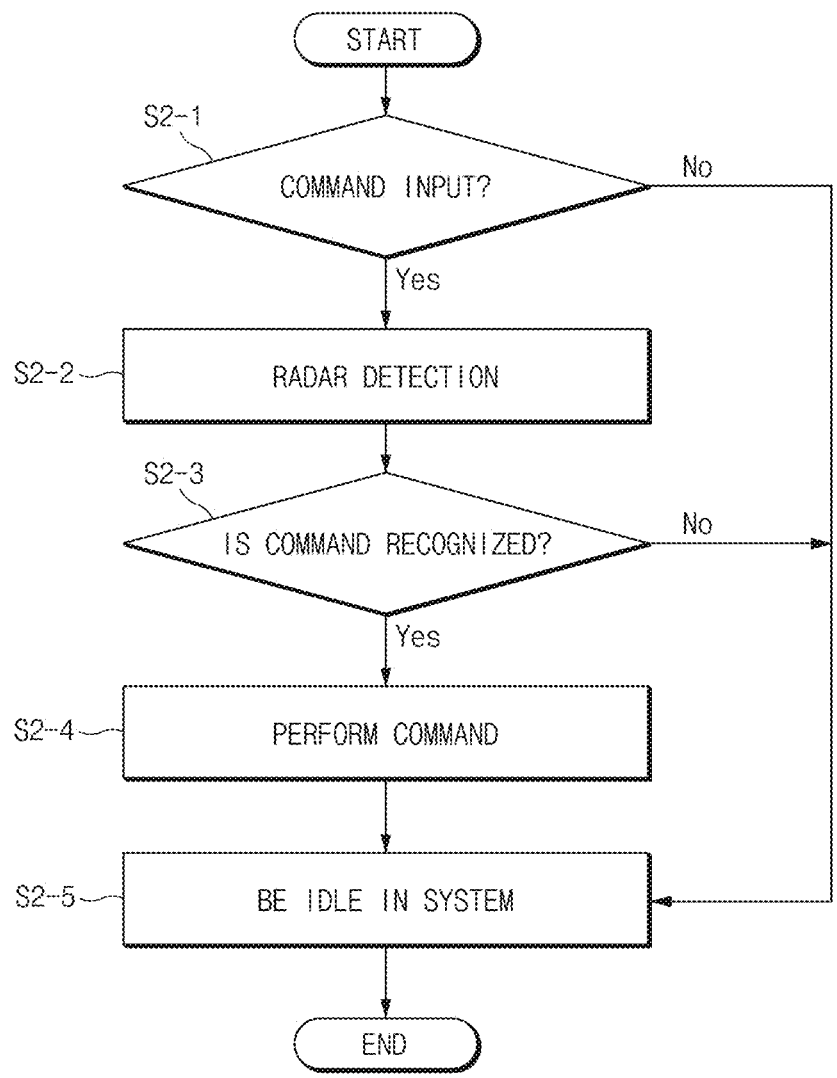

FIG. 5 is a flowchart illustrating an operation of a sensor integration module for detecting vehicle interior in a driving situation according to an embodiment of the present disclosure.

Referring to FIG. 5, an operation method of the sensor integration module for detecting the vehicle interior according to an embodiment of the present disclosure may include inputting (S2-1) a command, radar detection (S2-2), recognizing (S2-3) the command, performing (S2-4) the command, and being idle (S2-5) in the system.

S2-1 may include inputting, by a driver or a passenger, a command to enable a radar 11 of FIG. 1 after the vehicle is turned on.

After the vehicle is turned on, when the driver or the passenger inputs the command to enable the radar 11 in S2-1 (Yes), S2-2 may be performed.

After the vehicle is turned on, when the driver or the passenger does not input the command to enable the radar 11 in S2-1 (No), S2-5 may be performed.

In this case, S2-1 may include inputting the command to enable the radar 11 using a voice command or a button touch command of the driver or the passenger.

S2-2 may include detecting, by the enabled radar 11, a motion, i.e., a gesture, of the driver or the passenger.

For example, S2-2 may include detecting, by the enabled radar 11, a motion (gesture) of the driver or the passenger and providing, by enabled radar 11, a controller 20 of FIG. 1 with the detected result.

S2-3 may include determining whether the gesture of the driver or the passenger, detected in S2-2, is a predetermined motion.

When the gesture of the driver or the passenger, detected in S2-2, is identical to the predetermined motion (gesture) (Yes), S2-3 may include determining to recognize the command of the driver or the passenger. Thus, S2-3 may proceed to S2-4.

When the gesture of the driver or the passenger, detected in S2-2, is not identical to the predetermined gesture (No), S2-3 may include determining that the gesture of the driver or the passenger is not the command. Thus, S2-3 may proceed to S2-5.

S2-4 may include performing the command corresponding to the gesture of the driver or the passenger, which may include operating an electronic device in the vehicle, corresponding to the gesture of the driver or the passenger, for example, turning up or down the speaker volume or raising or lowering the window.

S2-5 may include switching to an idle state, when the command is not input in S2-1 or when the command is not recognized in S2-3.

For example, S2-5 may include switching to the idle state in the sensor integration module 100 for detecting the vehicle interior according to an embodiment of the present disclosure, when the command is not input in S2-1 or when the command is not recognized in S2-3.

In this case, detecting the gesture of the driver or the passenger using the radar 11 rather than the ultrasonic sensor 12 in the driving situation may be because the radar 11 is able to detect the gesture of the driver or the passenger within a shorter time because of having higher detection resolution than the ultrasonic sensor 12.

Thus, the sensor integration module 100 for detecting the vehicle interior according to an embodiment of the present disclosure may determine a motion for each passenger including the driver who rides in the vehicle within a short time to perform the command.

Figure 6:
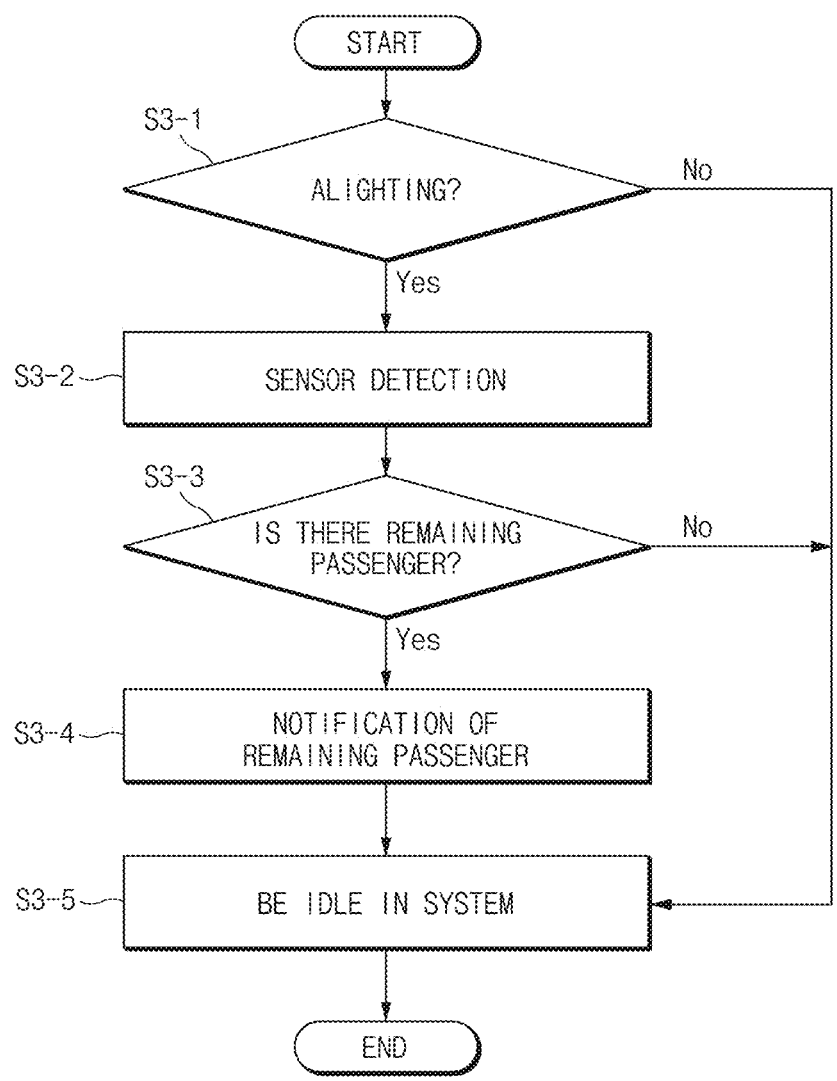

FIG. 6 is a flowchart illustrating an operation of a sensor integration module for detecting vehicle interior in an alighting situation according to an embodiment of the present disclosure.

Referring to FIG. 6, an operation method of the sensor integration module for detecting the vehicle interior according to an embodiment of the present disclosure may include determining (S3-1) an alighting situation, sensor detection (S3-2), determining (S3-3) whether there is a remaining passenger, a notification of the remaining passenger (S3-4), and being idle (S3-5) in the system.

S3-1 may include determining a situation where passengers (including a driver) riding in a vehicle alight from the vehicle. The determination may include determining the current situation as an alighting situation, when the vehicle is turned off and the door is locked.

For example, when the vehicle is turned off and the door is locked (Yes), S3-1 may include determining the current situation as the alighting situation. Thus, S3-1 may proceed to S3-2.

Meanwhile, when the vehicle is not turned off and the door is not locked (No), S3-1 may include determining that the current situation is not the alighting situation. Thus, S3-1 may proceed to S3-5.

When it is determined that the current situation is the alighting situation in S3-1, S3-2 may include enabling both of a radar 11 and an ultrasonic sensor 12 of FIG. 1 and providing a controller 20 of FIG. 1 with the results sensed by the enabled radar 11 and the enabled ultrasonic sensor 12.

S3-3 may include determining whether there is a passenger in the vehicle based on the result sensed in S3-2.

For example, when it is determined that the passenger who rides in the vehicle is detected based on the results sensed by the enabled radar 11 and the enabled ultrasonic sensor 12, i.e., when there is the remaining passenger (Yes), S3-3 may proceed to S3-4.

Meanwhile, when it is determined that the passenger who rides in the vehicle is not detected based on the results sensed by the enabled radar 11 and the enabled ultrasonic sensor 12, i.e., when there is no remaining passenger (No), S3-5 may proceed to S3-5.

S3-4 may be performed when it is determined that there is a remaining passenger in S3-3. S3-4 may include delivering information indicating that there is a passenger who remains in the vehicle to at least one of a display device, an alarm device, or a TMS. Thus, a driver or persons around the vehicle may be notified that there is the passenger in the vehicle.

S3-5 may include switching to an idle state, when it is not determined that the current situation is the alighting situation in S3-1 or when there is no passenger in the vehicle in S3-3.

For example, S3-5 may include switching to the idle state in the sensor integration module 100 for detecting the vehicle interior according to an embodiment of the present disclosure, when it is not determined that the current situation is the alighting situation in S3-1 or when there is no passenger in the vehicle in S3-3.

In this case, detecting the passenger by using both the radar 11 and the ultrasonic sensor 12 in the alighting situation may be to more accurately determine whether there is the remaining passenger.

Thus, the sensor integration module 100 for detecting the vehicle interior according to an embodiment of the present disclosure may more accurately determine whether there is a passenger and may notify the inside and the outside of the vehicle that there is the passenger who remains in the vehicle in a visual and audible manner.

Figure 7:
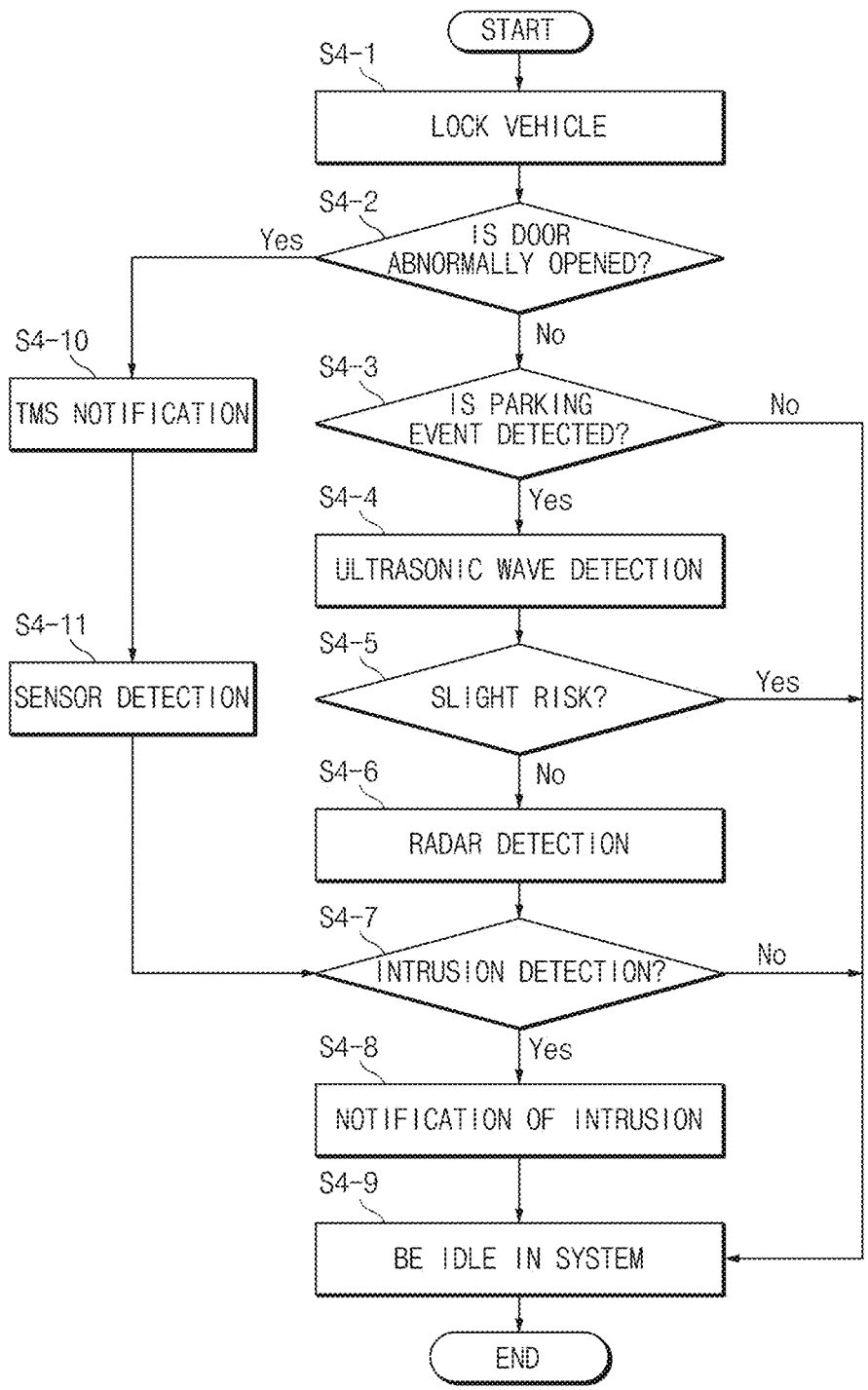

FIG. 7 is a flowchart illustrating an operation of a sensor integration module for detecting vehicle interior in a parking situation and an intrusion detection situation according to an embodiment of the present disclosure.

Referring to FIG. 7, an operation method of the sensor integration module for detecting the vehicle interior according to an embodiment of the present disclosure may include locking (S4-1) a vehicle, detecting (S4-2) that the door is abnormally opened, detecting (S4-3) a parking event, ultrasonic wave detection (S4-4), determining (S4-5) a slight risk, radar detection (S4-6), detecting (S4-7) intrusion, delivering a notification of the intrusion (S4-8), being idle (S4-9) in the system, transmitting a TMS notification (S4-10), and performing a sensor detection (S4-11).

S4-1 may include detecting that the vehicle door changes to a lock state after the vehicle is turned off and determining the current situation as a parking situation.

For example, S4-1 may include determining the current situation as the parking situation, when a controller 20 of FIG. 1 receives information indicating that the vehicle is turned off and information indicating that the vehicle door changes to the lock state from a starter and a vehicle door detection device via a first communication device 31 of FIG. 1.

S4-2 may include detecting that the vehicle door in the lock state changes to an abnormal open state.

For example, S4-2 may include receiving, by the controller 20, information indicating that the vehicle door in the lock state is abnormally opened from the vehicle door detection device via the first communication device 31.

When it is determined that the door in the lock state is abnormally opened (Yes), S4-2 may proceed to S4-10.

Meanwhile, when it is determined that the door in the lock state is not abnormally opened (No), i.e., when it is determined that the door maintains the lock state, S4-2 may proceed to S4-3.

S4-3 may include detecting occurrence of an event where impact or vibration is applied to the vehicle in the parking situation.

When the event where the impact or the vibration is applied to the vehicle is not detected, S4-3 may proceed to S4-9.

Meanwhile, when the event where the impact or the vibration is applied to the vehicle is detected, S4-3 may proceed to S4-4.

S4-4 may include enabling an ultrasonic sensor 12 of FIG. 1 when the event where the impact or the vibration is applied to the vehicle is detected in S4-3 and providing a determination component (e.g., the controller 20) with a sensing result of the enabled ultrasonic sensor 12.

S4-5 may include determining whether the impact or the vibration applied to the vehicle is an impact or vibration by wind or light contact (whether the current situation is a slight risk) based on the sensing result of the ultrasonic sensor 12, which is provided in S4-4.

When it is determined that the current situation is the slight risk in S4-5 (Yes), S4-9 may be performed.

When it is determined that the current situation is not the slight risk in S4-5 (No), S4-6 may be performed.

In this case, determining whether the current situation is the slight risk may include distinguishing when the amount of impact or vibration detected is greater than a predetermined amount of impact or vibration from when the amount of impact or vibration detected is not greater than the predetermined amount of impact or vibration. The determination may be performed based on the amount of impact or vibration applied when an adult rides in the vehicle.

S4-6 may include enabling a radar 11 of FIG. 1 when it is determined that the current situation is not the slight risk in S4-5, i.e., when it is determined that the current situation is a high risk. S4-6 may also include providing the determination component (e.g., the controller 20) with a sensing result of the enabled radar 11.

S4-7 may include determining whether there is an intruder, a location of the intruder, and a motion of the intruder based on the sensing results of the enabled radar 11 and the enabled ultrasonic sensor 12.

When it is determined that there is no intruder in S4-7 (No), S4-9 may be performed.

When it is determined that there is the intruder in S4-7 (Yes), S4-8 may be performed.

S4-8 may include delivering the location and the motion of the intruder, which are determined in S4-7, to a display device (a display), an alarm device (a speaker), and a TMS inside and outside the vehicle. In this case, S4-8 may include notifying a driver or persons around the vehicle of information indicating that there is the intruder in the vehicle, the location of the intruder, and the motion of the intruder.

S4-9 may include switching to an idle state, when the event is not detected in the parking situation in S4-3, when it is determined that the current situation is the slight risk in S4-5, or when the intruder is not detected in S4-7.

For example, S4-9 may include switching to the idle state in the sensor integration module 100 for detecting the vehicle interior according to an embodiment of the present disclosure, when the event is not detected in the parking situation in S4-3, when it is determined that the current situation is the slight risk in S4-5, or when the intruder is not detected in S4-7.

S4-10 may be performed when the abnormal opening of the door is detected in S4-2 (Yes). S4-10 may include transmitting text indicating that the vehicle door is abnormally opened to an electronic device such as a portable terminal of the driver.

For example, S4-10 may include receiving, by the controller 20, information indicating that the door is abnormally opened from a vehicle door detection device, providing, by the controller 20, the TMS with information indicating that the vehicle door is abnormally opened via a first communication device 31 of FIG. 1. S4-10 may also include providing, by the TMS, the driver with a warning text (e.g., text indicating that the vehicle door is abnormally opened).

S4-11 may include enabling both the radar 11 and the ultrasonic sensor 12 after (or at the same as) S4-10 is performed.

S4-7 described above may be performed after S4-11 is performed.

In other words, when the abnormal opening of the door is detected, the warning text may be transmitted to the driver and the radar 11 and the ultrasonic sensor 12 may be enabled. In this case, S4-7 may be performed.

S4-7 may include, as described above, determining whether there is an intruder, a location of the intruder, and a motion of the intruder based on the sensing results of the enabled radar 11 and the enabled ultrasonic sensor 12.

When it is determined that there is no intruder in S4-7 (No), S4-9 may be performed.

Meanwhile, when it is determined that there is the intruder in S4-7 (Yes), S4-8 may be performed.

To summarize, the operation of the sensor integration module for detecting the vehicle interior in the parking situation and the intrusion detection situation according to an embodiment of the present disclosure in FIG. 7 is as follows.

When the abnormal opening of the door is detected, the sensor integration module for detecting the vehicle interior according to an embodiment of the present disclosure may transmit a warning text to the portable terminal of the driver via the TMS. The sensor integration module may also enable the radar 11 and the ultrasonic sensor 12 to detect and determine whether there is an intruder, a location of the intruder, and a motion of the intruder. The sensor integration module may also notify the driver and persons around the vehicle of the determined result.

Furthermore, although the abnormal opening of the door is not detected, when the parking event occurs (when impact or vibration is detected), the sensor integration module for detecting the vehicle interior according to an embodiment of the present disclosure may enable the ultrasonic sensor 12. The sensor integration module may also determine whether the current situation is a slight risk situation or a high risk situation based on the sensing result provided from the enabled ultrasonic sensor 12 The sensor integration module may also enable the radar 11 when the current situation is the high risk such as an intrusion situation. The sensor integration module may also detect and determine whether there is an intruder, a location of the intruder, and a motion of the intruder based on the sensing results of the enabled radar 11 and the enabled ultrasonic sensor 12. The sensor integration module may notify the driver and persons around the vehicle of the determined result.

In other words, when it is determined that the vehicle door abnormally opened or when impact or vibration applied to the vehicle occurs in a high risk situation, the sensor integration module for detecting the vehicle interior according to an embodiment of the present disclosure may perform more accurate detection and determination by using both the radar 11 and the ultrasonic sensor 12.

When an impact or vibration is applied to the vehicle when the vehicle door maintains the lock state, the sensor integration module for detecting the vehicle interior according to an embodiment of the present disclosure may enable only the ultrasonic sensor 12 and may determine a slight risk situation and a high risk situation. Thus, power consumption of the vehicle may be reduced.

Figure 8:
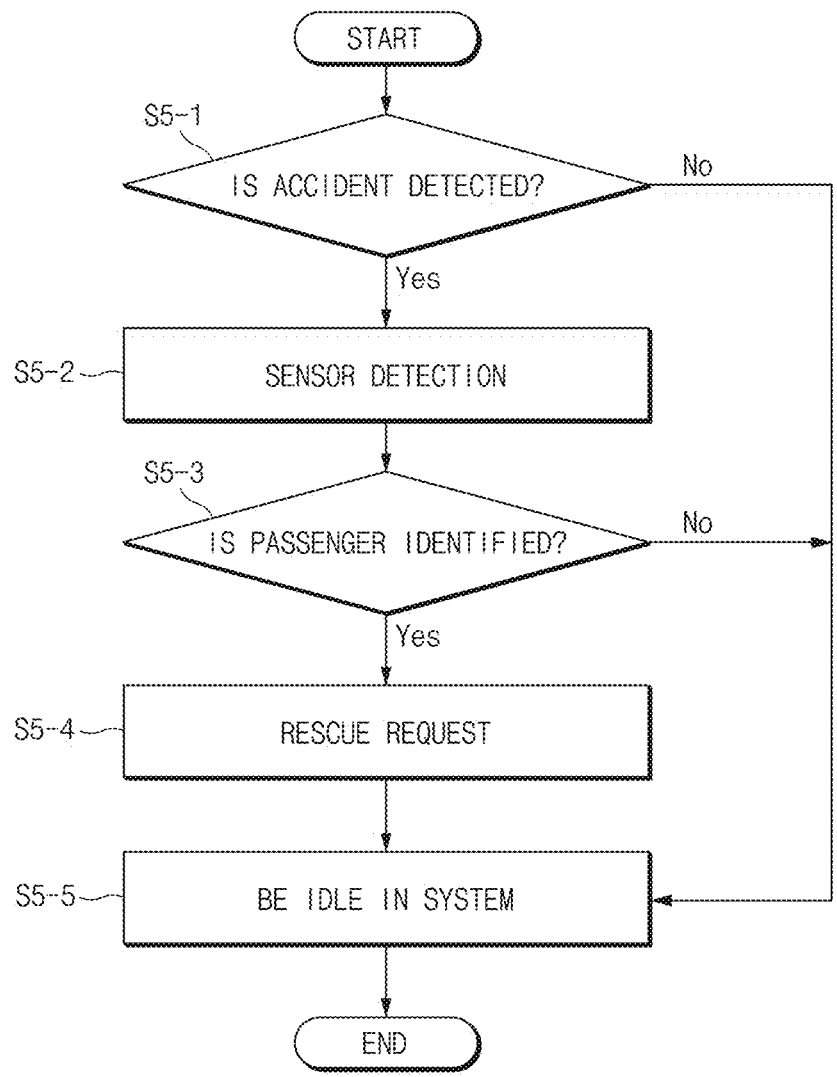

FIG. 8 is a flowchart illustrating an operation of a sensor integration module for detecting vehicle interior information in a vehicle accident (e.g., traffic accident) situation according to an embodiment of the present disclosure.

Referring to FIG. 8, an operation method of the sensor integration module for detecting the vehicle interior according to an embodiment of the present disclosure may include detecting (S5-1) an accident, performing a sensor detection (S5-2), identifying (S5-3) a passenger, notifying a rescue request (S5-4), and being idle (S5-5) in the system.

S5-1 may include detecting and determining whether a vehicle accident occurs.

For example, S5-1 may include determining that an accident occurs, when the airbag is deployed or when impact of a predetermined amount or more is detected.

When it is determined that the accident occurs in the vehicle (Yes), S5-1 may proceed to S5-2.

Meanwhile, when it is determined that the accident does not occur in the vehicle (No), S5-1 may proceed to S5-5.

S5-2 may be performed when the accident occurs in the vehicle in S5-1. S5-2 may include enabling a radar 11 and an ultrasonic sensor 12 of FIG. 1.

S5-3 may include detecting and determining whether there is a passenger who rides in the vehicle, a location of the passenger, and a motion of the passenger based on sensing results provided from the enabled radar 11 and the enabled ultrasonic sensor 12.

For example, when the presence of the passengers including the driver is detected based on the sensing results provided from the enabled radar 11 and the enabled ultrasonic sensor 12 (Yes), S5-3 may proceed to S5-4.

Meanwhile, when the presence of the passenger is not detected based on the sensing results provided from the enabled radar 11 and the enabled ultrasonic sensor 12 (No), S5-3 may proceed to S5-5.

S5-4 may be performed, when the presence of the passenger is detected in the accident situation in S5-3. S5-4 may include notifying the inside and the outside of the vehicle of the occurrence of the accident, the presence of the passenger, the location of the passenger, and the motion of the passenger by means of a display device, an alarm device, and a TMS.

When the presence of the passenger is detected in the accident situation, S5-4 may include notifying persons around the vehicle and a predetermined institution (e.g., a call center, 119, a police station, or the like) of the occurrence of the accident, the presence of the passenger, the location of the passenger, and the motion of the passenger.

S5-5 may include switching to an idle state, when the airbag is not deployed in S5-1, when the amount of impact, which is greater than or equal to a predetermined amount, is not detected in S5-1, or when the presence of the passenger is not detected in S5-3.

For example, S5-5 may include switching to the idle state in the sensor integration module 100 for detecting the vehicle interior according to an embodiment of the present disclosure, when the airbag is not deployed in S5-1, when the amount of impact, which is greater than or equal to a predetermined amount, is not detected in S5-1, or when the presence of the passenger is not detected in S5-3.

To summarize, the above-mentioned operation of the sensor integration module for detecting the vehicle interior according to an embodiment of the present disclosure is as follows.

When the driving riding situation is detected, the sensor integration module for detecting the vehicle interior according to an embodiment of the present disclosure may enable only a radar between the radar and an ultrasonic sensor to identify whether the passenger rides in the vehicle and a riding position of the passenger. The sensor integration module may also provide at least one of the display device such as the display and the alarm device such as a speaker or a buzzer with information about the passenger who does not wear his or her seat belt. Thus, the passenger who does not wear his or her seat belt may be provided with a guidance on wearing the seat belt.

When the driving situation is detected, the sensor integration module for detecting the vehicle interior according to an embodiment of the present disclosure may enable only the radar between the radar and the ultrasonic sensor to recognize a command corresponding to a motion (gesture) of the passenger and may perform the recognized command.

When the alighting situation is detected, the sensor integration module for detecting the vehicle interior according to an embodiment of the present disclosure may enable both the radar and the ultrasonic sensor to detect whether there is a remaining passenger and may notify the driver and persons around the vehicle that there is the remaining passenger, when the remaining passenger is detected.

When the parking situation is detected and the abnormal opening of the door is detected, the sensor integration module for detecting the vehicle interior according to an embodiment of the present disclosure may provide the driver or persons around the vehicle with a warning text or a warning notification. The sensor integration module may also enable both the radar and the ultrasonic sensor to detect whether there is an intruder, a location of the intruder, and a motion of the intruder. The sensor integration module may also notify the driver and the persons around the vehicle of them.

When the parking situation is detected and impact or vibration applied to the vehicle is detected, the sensor integration module for detecting the vehicle interior according to an embodiment of the present disclosure may enable only the ultrasonic sensor between the radar and the ultrasonic sensor to determine whether the current situation is a slight risk. The sensor integration module may additionally enable the radar when it is determined that the current situation is a high risk situation such as intrusion rather than the slight risk to detect presence of the intruder, a location of the intruder, and a motion of the intruder. The sensor integration module may also notify the driver and persons around the vehicle of them.

When the vehicle accident situation is detected, the sensor integration module for detecting the vehicle interior according to an embodiment of the present disclosure may enable both the radar and the ultrasonic sensor and may provide the driver, persons around the vehicle, and predetermined institutions of whether there is a passenger, a location of the passenger, and a motion of the passenger.

As such, the sensor integration module for detecting the vehicle interior according to an embodiment of the present disclosure may be a technology capable of detecting whether there is an object (e.g., a driver, a passenger, or an intruder) in the vehicle, a location of the object, and a motion of the object and notifying the driver, persons around the vehicle, and a predetermined institution of them as visual information and audible information.

In this case, the sensor integration module for detecting the vehicle interior according to an embodiment of the present disclosure may use other types of sensors (e.g., a radar and an ultrasonic sensor) to detect whether there is an object in the vehicle, a location of the object, and a motion of the object.

Furthermore, the sensor integration module for detecting the vehicle interior according to an embodiment of the present disclosure may selectively enable a sensor suitable for a situation of the vehicle (e.g., driver riding, driving, alighting, parking, intrusion detection, or accident) among sensors. Thus, power consumption of the vehicle may be reduced and a more accurate detection result may be obtained.

In addition, the sensor integration module for detecting the vehicle interior according to an embodiment of the present disclosure may provide at least one of the driver, persons around the vehicle, or a predetermined institution with a notification according to a situation depending on the sensing result for each situation.

The presently disclosed technology may reduce power consumption of the vehicle, while maintaining a convenience function to use the vehicle.

The presently disclosed technology may operate only sensors suitable for respective situations, for example, when the driver rides in the vehicle, when the vehicle is traveling, immediately after the passenger alights from the vehicle, when the vehicle is parked, an intrusion detection situation, and a traffic accident situation, thus reducing power consumption.

In addition, various effects ascertained directly or indirectly through the present disclosure may be provided.

Hereinabove, although the present disclosure has been described with reference to specific embodiments and the accompanying drawings, the present disclosure is not limited thereto. The present disclosure may be variously modified and altered by those having ordinary skill in the art to which the present disclosure pertains without departing from the spirit and scope of the present disclosure claimed in the following claims.

Therefore, the specific embodiments of the present disclosure are provided to explain the spirit and scope of the present disclosure, but not to limit them. Thus, the spirit and scope of the present disclosure are not limited by the embodiments. The scope of the present disclosure should be construed on the basis of the accompanying claims and all the technical ideas within the scope equivalent to the claims should be included in the scope of the present disclosure.

What is claimed is:

1. A sensor integration module for detecting vehicle interior information, the sensor integration module comprising:
    a first sensor configured to be determined to be enabled or disabled based on first operation information and provide a sensing result as first sensing information;
    a second sensor configured to be determined to be enabled or disabled based on second operation information and provide a sensing result as second sensing information;
    a first communication device configured to transmit and receive information with electronic devices in a vehicle; and
    a controller configured to generate the first operation information and the second operation information for selectively enabling the first sensor and the second sensor based on information provided from the first communication device and provide the first communication device with a result determined based on the first sensing information and the second sensing information,
    wherein the controller is configured to
        determine a current situation as a driver riding situation when receiving information indicating that opening of a vehicle door is detected from the first communication device,
        determine the current situation as a driving situation when receiving information indicating that the vehicle is turned on from the first communication device,
        determine the current situation as an alighting situation when receiving information indicating that the vehicle is turned off and that the vehicle door is locked from the first communication device,
        determine the current situation as a parking situation when receiving information indicating that impact or vibration is detected in the vehicle after a predetermined time after the vehicle is turned off from the first communication device,
        determine the current situation as an intrusion detection situation when receiving information indicating that the vehicle door in a lock state is abnormally opened from the first communication device,
        determine the current situation as a vehicle accident situation when receiving information indicating that impact or vibration greater than a predetermined amount of impact or vibration is detected from the first communication device,
        enable only the first sensor when the driver riding situation or the driving situation is determined,
        enable only the second sensor when the parking situation is determined, and
        enable the first sensor and the second sensor when the alighting situation, the intrusion detection situation, or the vehicle accident situation is determined.

2. The sensor integration module of claim 1, wherein the first sensor includes:
    a radar configured to be enabled based on the first operation information, emit an electromagnetic wave, and receive the electromagnetic wave reflected from an object to generate the first sensing information.

3. The sensor integration module of claim 1, wherein the second sensor includes:
    an ultrasonic sensor configured to be enabled based on the second operation information, emit an ultrasonic wave, and receive the ultrasonic wave reflected from an object to generate the second sensing information.

4. The sensor integration module of claim 1, wherein the controller generates the first operation information, when the driver riding situation is determined, and determines a location of a passenger based on the first sensing information provided from the enabled first sensor and guides the passenger to wear his or her seat belt.

5. The sensor integration module of claim 1, wherein the controller generates the first operation information, when the driving situation is determined, and determines a gesture of a passenger based on the first sensing information provided from the enabled first sensor and performs a command corresponding to the gesture of the passenger.

6. The sensor integration module of claim 1, wherein the controller generates the first operation information and the second operation information, when the alighting situation is determined, and determines whether there is a remaining passenger based on the first sensing information and the second sensing information respectively provided from the enabled first sensor and the enabled second sensor.

7. The sensor integration module of claim 1, wherein the controller generates the second operation information, when the parking situation is determined, and determines whether there is intrusion based on the second sensing information provided from the enabled second sensor.

8. The sensor integration module of claim 7, wherein the controller generates the first operation information enabling the first sensor, when the intrusion is detected based on the second sensing information and determines whether there is an intruder, a location of the intruder, and a motion of the intruder based on the first sensing information and the second sensing information.

9. The sensor integration module of claim 1, wherein the controller generates the first operation information and the second operation information, when the intrusion detection situation is determined, and determines whether there is an intruder, a location of the intruder, and a motion of the intruder based on the first sensing information and the second sensing information respectively provided from the enabled first sensor and the enabled second sensor.

10. The sensor integration module of claim 1, wherein the controller generates the first operation information and the second operation information, when the vehicle accident situation is determined, and determines whether there is a passenger, a location of the passenger, and a motion of the passenger based on the first sensing information and the second sensing information respectively provided from the enabled first sensor and the enabled second sensor.

11. The sensor integration module of claim 1, wherein the controller generates the first operation information and the second operation information enabling at least one of the first sensor or the second sensor depending on the current situation and provides the first communication device with a location of a passenger who does not wear his or her seat belt, a command corresponding to a gesture of a passenger, whether there is a remaining passenger, whether there is intrusion, whether there is an intruder, a location of the intruder, a motion of the intruder, whether there is a passenger, a location of the passenger, or a motion of the passenger, which is determined based on the at least enabled one of the first sensor or the second sensor.

12. The sensor integration module of claim 1, further comprising:
a second communication device configured to transmit and receive information with another sensor integration module for detecting vehicle interior.

13. An operation method of a sensor integration module for detecting vehicle interior information, the operation method comprising:
identifying a current situation as a driver riding situation, a driving situation, an alighting situation, a parking situation, an intrusion detection situation, and a vehicle accident situation;
selectively enabling a first sensor and a second sensor depending on the identified result;
receiving sensing information provided from the first sensor and the second sensor being selectively enabled; and
notifying a passenger that he or she does not wear his or her seat belt, performing a command corresponding to a gesture of the passenger, determining whether there is a remaining passenger, determining whether there is intrusion, determining whether there is an intruder, determining a location and motion of the intruder, determining whether there is a passenger, or determining a location and motion of the passenger based on the provided sensing information,
wherein identifying the current situation as the driver riding situation, the driving situation, the alighting situation, the parking situation, the intrusion detection situation, and the vehicle accident situation includes
determining the current situation as the driver riding situation, when receiving information indicating that opening of a vehicle door is detected from a first communication device,
determining the current situation as the driving situation, when receiving information indicating that a vehicle is turned on from the first communication device,
determining the current situation as the alighting situation, when receiving information indicating that the vehicle is turned off and that the vehicle door is locked from the first communication device,
determining the current situation as the parking situation, when receiving information indicating that impact or vibration is detected in the vehicle after a predetermined time after the vehicle is turned off from the first communication device,
determining the current situation as the intrusion detection situation, when receiving information indicating that the vehicle door in a lock state is abnormally opened from the first communication device, and
determining the current situation as the vehicle accident situation, when receiving information indicating that impact or vibration greater than a predetermined amount of impact or vibration is detected from the first communication device, and
wherein selectively enabling the first sensor and the second sensor depending on the identified result includes
enabling only the first sensor when the driver riding situation or the driving situation is determined,
enabling only the second sensor when the parking situation is determined, and
enabling the first sensor and the second sensor when the alighting situation, the intrusion detection situation, or the vehicle accident situation is determined.

14. The operation method of claim 13, wherein the enabling includes:
enabling a sensor with higher detection resolution for a detection area between the first sensor and the second sensor, after determining the current situation as the driver riding situation and after determining the current situation as the driving situation.

15. The operation method of claim 14, wherein the notifying includes:
notifying the passenger that he or she does not wear his or her seat belt and performing the command corresponding to the gesture of the passenger, based on sensing information provided from the enabled sensor with the higher detection resolution for the detection area between the first sensor and the second sensor.

16. The operation method of claim 13, wherein the enabling includes:
enabling a sensor with smaller power consumption between the first sensor and the second sensor, after determining the current situation as the parking situation.

17. The operation method of claim 16, wherein the determining includes:
determining whether there is the intrusion based on sensing information provided from the enabled sensor with the smaller power consumption between the first sensor and the second sensor.

18. The operation method of claim 13, wherein the enabling includes:
enabling both the first sensor and the second sensor, after determining the current situation as the alighting situation, after determining the current situation as the intrusion detection situation, and after determining the current situation as the vehicle accident situation.

19. The operation method of claim 18, wherein the determining includes:
determining whether there is the remaining passenger, determining whether there is the intruder, determining the location and motion of the intruder, determining whether there is the passenger, and determining the location and motion of the passenger, based on sensing information provided from the enabled first sensor and the enabled second sensor.

* * * * *